US007028298B1

(12) United States Patent
Foote (10) Patent No.: US 7,028,298 B1
(45) Date of Patent: Apr. 11, 2006

(54) APPARATUS AND METHODS FOR MANAGING RESOURCE USAGE

(75) Inventor: William F. Foote, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/394,118

(22) Filed: Sep. 10, 1999

(51) Int. Cl.
G06F 9/46 (2006.01)

(52) U.S. Cl. ..................................... 718/104; 709/226

(58) Field of Classification Search ............... 709/100, 709/104, 223, 226, 201, 224, 108, 202, 310; 707/103; 718/104
See application file for complete search history.

(56) References Cited

U.S. PATENT DOCUMENTS

| 5,361,347 | A | * | 11/1994 | Glider et al. ................. 714/44 |
| 5,568,635 | A | * | 10/1996 | Yamaguchi ................. 711/171 |
| 5,594,904 | A | * | 1/1997 | Linnermark et al. ........ 717/124 |
| 5,764,235 | A | * | 6/1998 | Hunt et al. .................. 345/428 |
| 5,826,239 | A | * | 10/1998 | Du et al. ........................ 705/8 |
| 5,838,968 | A | * | 11/1998 | Culbert ....................... 709/104 |
| 5,905,860 | A | * | 5/1999 | Olsen et al. ................. 713/201 |
| 5,918,229 | A | * | 6/1999 | Davis et al. ................... 707/10 |
| 5,958,010 | A | * | 9/1999 | Agarwal et al. ............ 709/224 |
| 5,961,586 | A | * | 10/1999 | Pedersen ..................... 709/201 |
| 5,983,316 | A | * | 11/1999 | Norwood ..................... 711/112 |
| 6,006,248 | A | * | 12/1999 | Nagae ......................... 718/105 |
| 6,055,650 | A | * | 4/2000 | Christie ........................ 714/39 |
| 6,064,974 | A | * | 5/2000 | Broekhuijsen ................. 705/8 |
| 6,112,240 | A | * | 8/2000 | Pogue et al. ................. 709/224 |
| 6,173,289 | B1 | * | 1/2001 | Sonderegger et al. ... 707/103 R |
| 6,182,022 | B1 | * | 1/2001 | Mayle et al. ................. 702/182 |
| 6,184,878 | B1 | * | 2/2001 | Alonso et al. ............... 725/109 |
| 6,188,995 | B1 | * | 2/2001 | Garst et al. .................... 705/59 |
| 6,219,708 | B1 | * | 4/2001 | Martenson .................. 709/226 |
| 6,259,448 | B1 | * | 7/2001 | McNally et al. ............ 345/733 |
| 6,275,983 | B1 | * | 8/2001 | Orton et al. ................. 717/116 |
| 6,279,034 | B1 | * | 8/2001 | Jarriel et al. ................ 709/223 |
| 6,289,446 | B1 | * | 9/2001 | Nilsson ....................... 712/244 |
| 6,295,602 | B1 | * | 9/2001 | Weissman et al. ............ 713/1 |
| 6,298,422 | B1 | * | 10/2001 | Spilo et al. ................. 711/154 |
| 6,302,795 | B1 | * | 10/2001 | Ito .............................. 463/29 |
| 6,314,563 | B1 | * | 11/2001 | Agesen et al. .............. 717/108 |
| 6,317,869 | B1 | * | 11/2001 | Adl-Tabatabai et al. .... 717/132 |
| 6,327,622 | B1 | * | 12/2001 | Jindal et al. ................. 709/228 |
| 6,327,702 | B1 | * | 12/2001 | Sauntry et al. ............. 717/118 |
| 6,341,371 | B1 | * | 1/2002 | Tandri ......................... 717/158 |

(Continued)

OTHER PUBLICATIONS

William F. Foote, et al, "Terminating A Group Of Related Threads By Modifying The Prog Ram Counter Of Selected Stack Frames," U.S. Appl. No. 09/536,253, filed Mar. 27, 2000, 32 pages.

(Continued)

Primary Examiner—Meng-Al T. An
Assistant Examiner—Lilian Vo
(74) Attorney, Agent, or Firm—Beyer Weaver & Thomas, LLP (57) ABSTRACT

Disclosed is a method for managing resource usage of a particular resource by a set of related code, such as code executed on behalf of a downloaded applet. A resource indicator is associated with the related code, and the resource indicator indicates an amount of resource usage of the particular resource by the related code. The resource indicator is updated when the related code increases or decreases its collective resource usage of the particular resource.

32 Claims, 6 Drawing Sheets

U.S. PATENT DOCUMENTS

| | | | |
|---|---|---|---|
| 6,363,411 B1 * | 3/2002 | Dugan et al. | 709/202 |
| 6,363,421 B1 * | 3/2002 | Barker et al. | 709/223 |
| 6,370,572 B1 * | 4/2002 | Lindskog et al. | 709/223 |
| 6,381,321 B1 * | 4/2002 | Brown et al. | 379/207.02 |
| 6,421,737 B1 * | 7/2002 | Stone et al. | 709/318 |
| 6,430,570 B1 * | 8/2002 | Judge et al. | 707/103 R |
| 6,438,573 B1 * | 8/2002 | Nilsen | 709/100 |
| 6,449,723 B1 * | 9/2002 | Elgressy et al. | 713/201 |
| 6,463,454 B1 * | 10/2002 | Lumelsky et al. | 709/105 |
| 6,466,570 B1 * | 10/2002 | Low et al. | 370/352 |
| 6,553,403 B1 * | 4/2003 | Jarriel et al. | 709/202 |
| 6,633,898 B1 * | 10/2003 | Seguchi et al. | 709/201 |
| 2001/0003831 A1 * | 6/2001 | Boland | |
| 2001/0011254 A1 * | 8/2001 | Clark | 705/59 |
| 2002/0032763 A1 * | 3/2002 | Cox et al. | 709/223 |
| 2002/0083166 A1 * | 6/2002 | Dugan et al. | 709/223 |
| 2002/0095660 A1 * | 7/2002 | O'Brien et al. | |
| 2002/0099821 A1 * | 7/2002 | Hellerstein et al. | |
| 2003/0065770 A1 * | 4/2003 | Davis et al. | |
| 2003/0131141 A1 * | 7/2003 | Springmeyer et al. | 709/310 |

OTHER PUBLICATIONS

William F. Foote, et al, "Apparatus And Methods For Communicating Between Resource Domains," U.S. Appl. No. 09/727,103, filed Nov. 29, 2000, 32 pages.

William F. Foote, "Apparatus And Methods For Preventing Denial Of Service Attacks," U.S. Appl. No. 09/394,121, filed Sep. 10, 1999, 42 pages.

William F. Foote and Hideya Kawahara "Apparatus and Methods for Managing Resources for Resource Constrained Devices", U.S. Appl. No. 10/045,514, filed Oct. 26, 2001, 35 pages.

Hideya Kawahara, William F. Foote, and Dean R.E. Long, "Clean Thread Termination", U.S. Appl. No. 09/846,064, filed Apr. 30, 2001, 25 pages.

Foote, Bill "Description of JavaOS and PersonalJava", Jul. 15, 2002, Release date of PersonalJava 1.0 is Dec. 1997.

Philippe Bernadat, Laura Feeney, Dan Lambright, and Franco Travostino, "Java Sandboxes meet Service Guarantees: Secure Partitioning of CPU and Memory," Dec. 14, 1998, 24 pp.

Li Gong, "Secure Java Class Loading," Nov.-Dec. 1998, Mobile Code Security, pp. 56-61.

Chris Hawblitzel, Chi-Chao Chang, Grzegorz Czajkowski, Deyu Hu, and Thorsten von Eicken, "Implementing Multiple Protection Domains in Java," Technical Report 97-1660, Department of Computer Science, Cornell University, 15 pp.

Grzegorz Czajkowski and Thorsten von Eicken, "JRes: A Resource Accounting Interface for Java," Oct. 1998, In Proceedings of the 1998 ACM OOPSLA Conference, Vancouver BC, 15 pp.

Binder, Walter "*Design and Implementation of the J-SEAL2 Mobile Agent Kernel*", Application and the Internet, 2001.

Foote, William, "*Real-time Extensions to the Java Platform A Progress Report*", Electrical and Computer Engineering, 1999.

Chan, Patrick, et al. "The Java Class Library, Second Edition, vol. 1 (pp. 1723-1750) 1998".

Czajkowski, G and Von Eicken, T., "Jres: A Resource Accounting Interface for Java", Conference Proceedings OOPSLA '98, Vancouver, BC, Canada, 18-22, Oct. 1998, New York, NY, USA, ACM, USA.

Czajkowski, G, et al. "Internet Servers, Safe-Language Exetensions, and Structured Resource Control", Technology of Object-Oriented Languages and Systems, 1999. Proceedings of Nancy, France Jun. 7-10, 1999, Los Alamitos, CA, USA, IEEE Comput. Soc., US, Jun. 7, 1999, pp. 295-304.

Bettison, et al. "Limits-A System for Unix Resource Administration" Proceedings of the Supercomputing Conference. Reno, Nov. 13-17, 1989, New York, IEEE, US, vol. CONF. 2, pp. 686-692-0.

* cited by examiner

APPARATUS AND METHODS FOR MANAGING RESOURCE USAGE

CROSS REFERENCE TO RELATED APPLICATIONS

This application is related to concurrently filed U.S. patent application Ser. No. 09/394,121 entitled, "Apparatus and Methods for Preventing Denial of Service Attacks" by William F. Foote, which has assignment rights in common and is incorporated herein by reference for all purposes.

BACKGROUND OF THE INVENTION

The invention relates generally to software applications and, more particularly, to methods and apparatus for managing resource usage in an object-based system.

In the consumer field, there is intense pressure to keep costs down. Thus, the capabilities of memory and CPU devices within consumer systems, for example, are scaled down as much as possible to minimize overall costs. For example, cable television set top boxes typically include limited memory space and CPU capabilities. As object-based systems are integrated within consumer devices, it is becoming more important to manage resource usage effectively within the object-based systems. In other words, as a result of limited resources (among other reasons), a major issue within the object-oriented field is how to track and manage resource usage.

It is especially important to track resource usage of untrusted code. For example, it is important to track the resource usage of an applet that is downloaded from an untrusted URL into a set top box. The downloaded applet may be maliciously or unintentionally designed to consume an inordinate amount of resources, such as memory space or CPU time.

It is also important to track and manage resource usage of sets of related code. For example, the threads executed on behalf of an applet may together or individually consume too much of a limited resource of the set top box. Thus, it is not enough to simply track and manage the resource usage of individual threads. For example, an applet may initiate multiple threads that work together to consume resources. Tracking resource usage of individual threads only allows one to kill an individual thread. However, prior to killing a resource consuming thread, an applet may launch another resource consuming thread. In other words, if a way existed for determining that an applet or set of related code is consuming too much of a resource, all threads that are associated and/or controlled by the greedy applet may be prevented together from consuming too much of a resource.

In sum, there is a need for improved methods and apparatus for tracking and managing resource usage. Additionally, there is a need for mechanisms for tracking and managing resource usage for sets of related code.

SUMMARY OF THE INVENTION

Broadly speaking, the present invention fills these needs by providing apparatus and methods for managing resource usage of related code, such as code executed on behalf of an applet. In one embodiment, a method for managing the usage of a particular resource by a set of related code is disclosed. A resource indicator is associated with the related code, and the resource indicator indicates an amount of resource usage of the particular resource by the related code. For example, a counter tracks how many bytes (e.g., of Java™ heap memory) are being consumed by code executed on behalf of an applet. The resource indicator is updated when the related code increases or decreases its collective resource usage of the particular resource. For example, the counter is increased when the applet increases its memory usage by having memory allocated for its use, and the counter is decreased when the applet's memory is reclaimed.

In another embodiment, the invention is implemented in a computer readable medium containing computer codes for managing resource usage. The computer readable medium includes computer code for associating a resource indicator with the related code that indicates an amount of resource usage of the particular resource by the related code and computer code for updating the resource indicator when the related code increases or decreases its collective resource usage of the particular resource.

In another embodiment, a computer system for managing resource usage by a set of related code is disclosed. The computer system includes a resource context associated with the set of related code. For example, a resource is associated with each set of applets from a particular source (e.g., URL). The resource context includes a resource indicator that is associated with a resource type and indicative of how much of the resource type is being utilized by the set of related code. For example, the resource context includes a counter for tracking the amount of memory (e.g., Java™ heap) utilized by the resource context's applets. The computer system also includes a resource object associated with the resource context. The resource object indicates how much of the resource type may be utilized by the set of related code. For example, a memory counter indicates that the resource context's applets may only use 28 bytes of memory (e.g., Java™ heap). The computer system further includes an update mechanism configured to increment the resource indicators of the resource context when the set of related code increases its resource usage of the resource type associated with the updated resource indicator.

The present invention has several associated advantages. For example, by tracking the resource usage of related code (e.g., applets from the same source), actions to halt or prevent overuse of resources may be implemented on an entire set of related code. For example, if an applet is downloaded from a particular web site into a set top box, the applet's usage of the set top resources may be carefully monitored. When the applet's usage gets too high, the applet may be warned that it needs to cut its resource usage or be terminated. If the applet continues to increase its resource usage, the threads associated with the applet may be terminated together. Thus, if the applet is maliciously designed to produce multiple resource consuming threads, all of the threads may be aborted together. Additionally, any system threads that execute applet code may have that execution reliably terminated in a way that does not corrupt the state of resource objects that are not owned by the malicious applet.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the invention pertains to methods and apparatus for managing resource usage among related code, such as code executed on behalf of an applet that is downloaded from a particular web site. Related code may include any code that may logically be charged as a single entity for it's resource usage. For example, related code may include threads or methods that are directly executed by the applet as part of the downloaded code and/or threads on methods that are initiated by the applet. For instance, a system method may be called by an applet method. Related code may also include code executed on behalf of multiple applets from a same source (e.g., web site) or from related sources (e.g., sites owned by the same company). Related code may also take forms other than applets.

For simplicity, the code executed on behalf of an applet will be used throughout the specification as an example of related code. In the illustrated embodiment, resource usage is tracked for each applet. For example, the total memory consumption of an applet may be tracked and managed. By way of another example, the CPU time taken by an applet for a particular duration of time (e.g., CPU time as a percentage of the time period) may also be tracked and managed.

Resource usage is also tracked by associating some kind of indicator with each applet. The indicator tracks how much of a particular resource is consumed by the applet. The indicator may track the absolute consumption of a particular resource. For example, a counter tracks the number of bytes (e.g., of Java™ heap memory) that a particular applet consumes. Alternatively, the indicator may track the relative consumption of a particular resource. By way of example, a CPU usage indicator tracks a percentage of a predefined period of time that an applet is using the CPU. Each applet may have a plurality of associated indicators that each track how much of a particular resource type is being consumed by the applet and related code. For example, each applet may have a memory usage indicator, a CPU usage indicator, and a network usage indicator.

Each resource object that is allocated or utilized may also be associated with a responsible applet. Any suitable factors may be considered to determine which applet or set of applets is responsible for a particular resource object. For example, when a memory block is allocated on behalf of an applet, that applet is deemed responsible for that memory block and is then associated with the allocated memory block. Several embodiments of mechanisms for associating a resource object with a responsible set of related code are outlined below with references to FIG. 1.

After a resource object is associated with a particular applet, the appropriate resource indicators of the applet may then be updated after the resource object is allocated for the applet's use and after the resource object is deallocated from the applet. For example, when a memory block is allocated for an applet's use, the applet's memory counter is incremented by the size of the allocated memory block.

Some of the mechanisms that are used for tracking resource usage of a applet may be represented in the form of an entity (herein called a resource context). Additionally, the resource context is an entity against which that resource usage may be charged when code that is associated with the resource context utilizes a resource. In other words, a resource context is an entity through which resource usage can be tracked and managed. A resource context may also be associated with a body of code and the resources consumed by the execution of such body of code.

Figure 1:
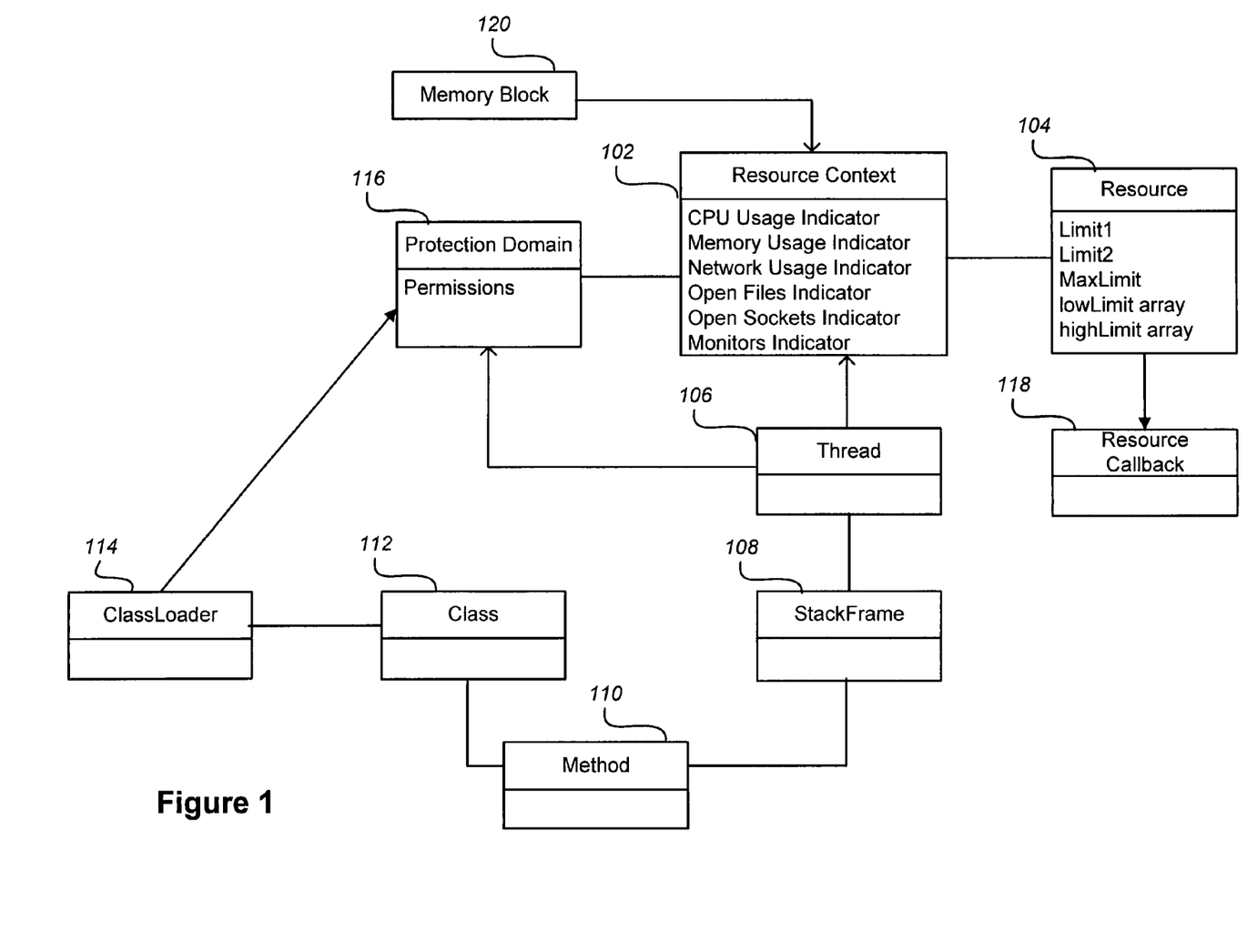
FIG. 1 is a diagrammatic representation of the relationships between mechanisms for managing resource usage in accordance with one embodiment of the present invention.

FIG. 1 is a diagrammatic representation of the relationships between various mechanisms for managing resource usage in accordance with one embodiment of the present invention. As shown, a resource context 102 includes a set of indicators for tracking how much of each resource type that the resource context is consuming. In one embodiment, the indicators track CPU usage, memory usage, network usage, number of open files, number of open sockets, and number of monitors.

The resource context 102 may also be associated with one or more predetermined limits for each resource type (e.g., heap memory). Each set of limits indicates how much of the associated resource type that the resource context's associated code may access before an action is taken to prevent resource over consumption. For example, the resource context 102 may be associated with three memory usage limits: 2 kbytes, 4 kbytes, and 5 kbytes (the maximum usage). When the resource context's memory usage exceeds 2 kbytes, the applet associated with the resource context may be warned that it's resource usage is 3 kbytes away from reaching the maximum value of 5 kbytes. After the resource context's memory usage exceeds 4 kbytes, the resource context may be warned that it is about to be terminated for consumming too much of a resource. Memory allocation may no longer be allowed when an applet exceeds the first and/or second limits. After usage exceeds 5 kbytes the resource context's applet may be terminated without warning.

In the illustrated embodiment of FIG. 1, the resource context 102 is associated with a resource object 104 that includes a plurality of memory usage limits or thresholds: limit1, limit2, MaxLimit, a lowLimit array, and a highLimit array for a particular resource type (e.g., memory). Although it is not shown, the resource context may be associated with any number of resource objects (e.g., a resource object for each of the following resources: CPU usage, network usage, socket usage, file usage, and monitor usage).

Turning back to FIG. 1, MaxLimit represents the maximum amount of memory that may be consumed by the related code associated with the resource context. Limit1 and limit2 represent thresholds that may be utilized to trigger a warning to the applet that memory usage is approaching the maximum threshold. For example, limit1 may be set to 1 kilobyte; limit2 to 2 kilobytes; and MaxLimit to 3 kilobytes of memory usage.

When limit1 is exceeded by the associated resource context (e.g., the associated applet uses more than 1 kilobyte), the applet is notified that it is approaching the maximum usage limit. When limit2 is exceeded (e.g., the associated applet uses more than 2 kilobytes), the applet may be notified that it is even closer to the maximum usage limit. When the maximum usage is exceeded (the applet uses more than 3 kilobytes), the applet's memory access may simply be terminated without any further warnings. Likewise, when the applet drops below a threshold, the applet may be notified that the it is no longer approaching the maximum threshold limit.

Any mechanism may be implemented for notifying the applet that memory is about to be exceeded or no longer about to be exceeded. In the illustrated embodiment, the resource object 104 has access to a resource callback 118. A resource object gains access to a resource callback when an application registers and indicates a desire to be notified of resource usage. When a threshold is exceeded or when a same or other threshold is no longer exceeded, a callback is initiated for registered users.

A pair of values may be provided for each limit to obtain a hysteresis effect. For example, once resource usage exceeds limit1, the resource usage has to drop below a lowLimit value that is lower than the limit1 value to trigger a notification. Resource usage has to then exceed a highLimit value that is higher than the limit1 value to again trigger a notification. Likewise, a lowLimit value and a highLimit value are provided for limit2 and MaxLimit.

The resource context is associated with a particular set of related code. This association may occur in any suitable manner. For example, the application framework that receives application code sets may predetermine the assignment of resource contexts to particular sets of related code. This determination may be based on any suitable policy considerations. For instance, all the code that is assigned to a particular protection domain may be assigned to a single resource context. As will be appreciated by those skilled in the art, a protection domain (which feature is included within the security features of JDK 1.2) generally accords permissions to a set of code. In other words, the mechanisms for assigning a protection domain to a particular set of code may be leveraged to assign a resource context to the same set of code.

A protection domain is generally associated with a particular thread based on which classloader was used to load the class of the method being executed by that particular thread. Several embodiments for assigning protection domains to threads based on classloader are described in *Java 2 Platform Security Architecture, API Design, and Implementation* by Li Gong (published by Addison Wesley, ISBN 0-201-31000-7), which text is herein incorporated by reference in its entirety.

As shown in FIG. 1, a particular thread 106 that is executing on behalf of resource context 102 is also executing within protection domain 116. More specifically, a particular method 110 of the thread 106 is currently being executed, and the method 110 is associated with a corresponding stackframe 108. The currently executing method 110 of the thread 106 is loaded as part of a class 112 by classloader 114. Classloader 114 is associated with protection domain 116 that may then be associated with resource context 102. In one embodiment, each thread may be assigned to and traced to an associated resource context through a classloader and its associated protection domain.

Of course, several sets of code that belong to different protection domains may be assigned to a same resource context. For example, a first applet may originate from a Pepsi controlled web site, and a second applet may originate from a Pizza Hut controlled web site. Although the two applets may have different protection domains since they originate from different web sites and are loaded by different class loaders, one may wish to charge resource usage against a same resource context since Pizza Hut and Pepsi are commonly owned.

Some of the mechanisms for tracking resource usage may also be associated with the resource itself. In one embodiment, each allocated resource object may be referenced to a responsible resource context. As shown, a memory block 120 contains a pointer to the responsible resource context 102 that is associated with a set of code that is responsible for the memory block. Thus, allocation of the resource may be charged against the responsible resource context, and deallocation may be credited towards the responsible resource context through the associated pointer. For example, the appropriate resource counter of the responsible resource context is incremented when the resource is allocated.

Figure 2A:
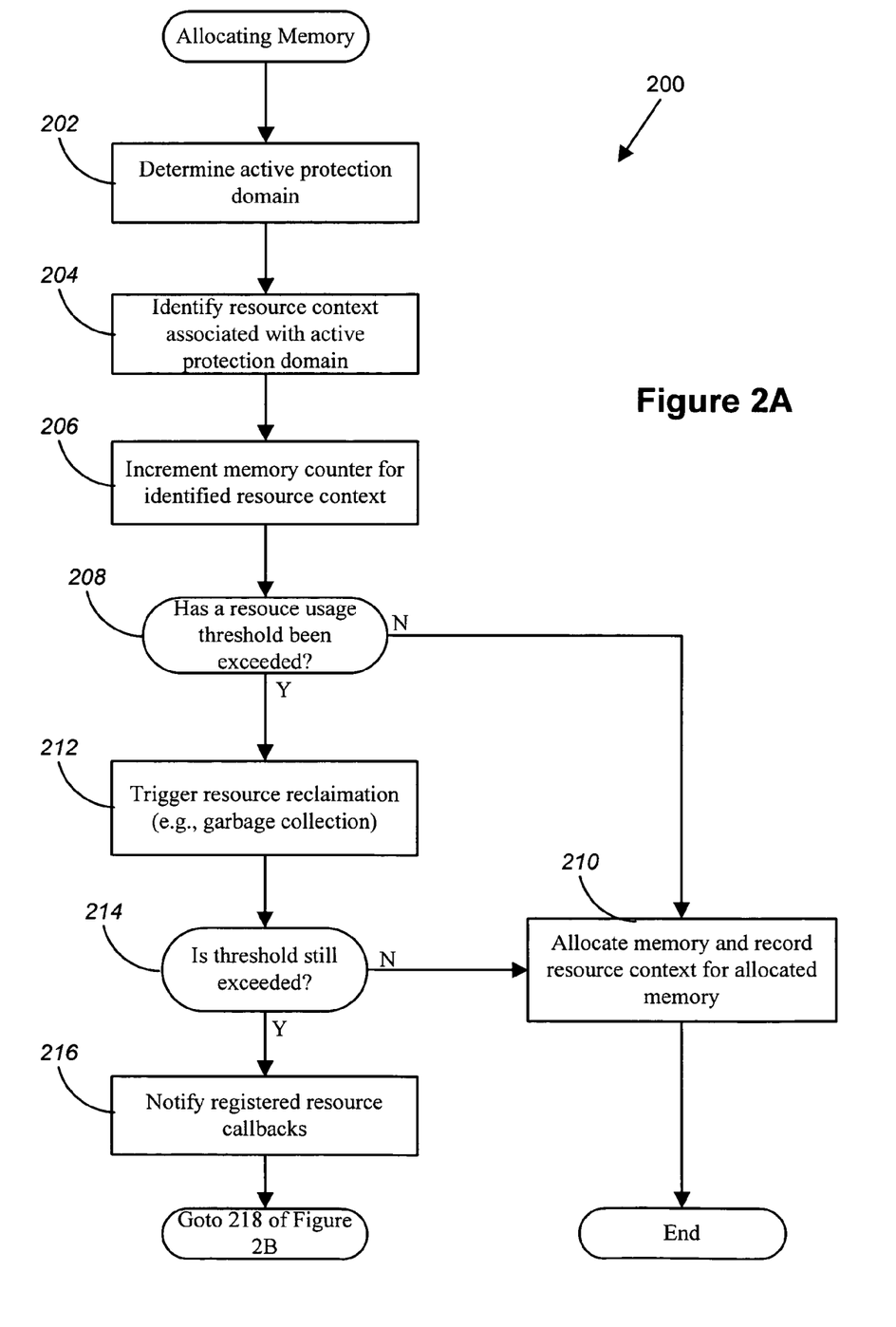
FIGS. 2A and 2B represent a flowchart illustrating a process for allocating memory in accordance with embodiment of the present invention.
Figure 2B:
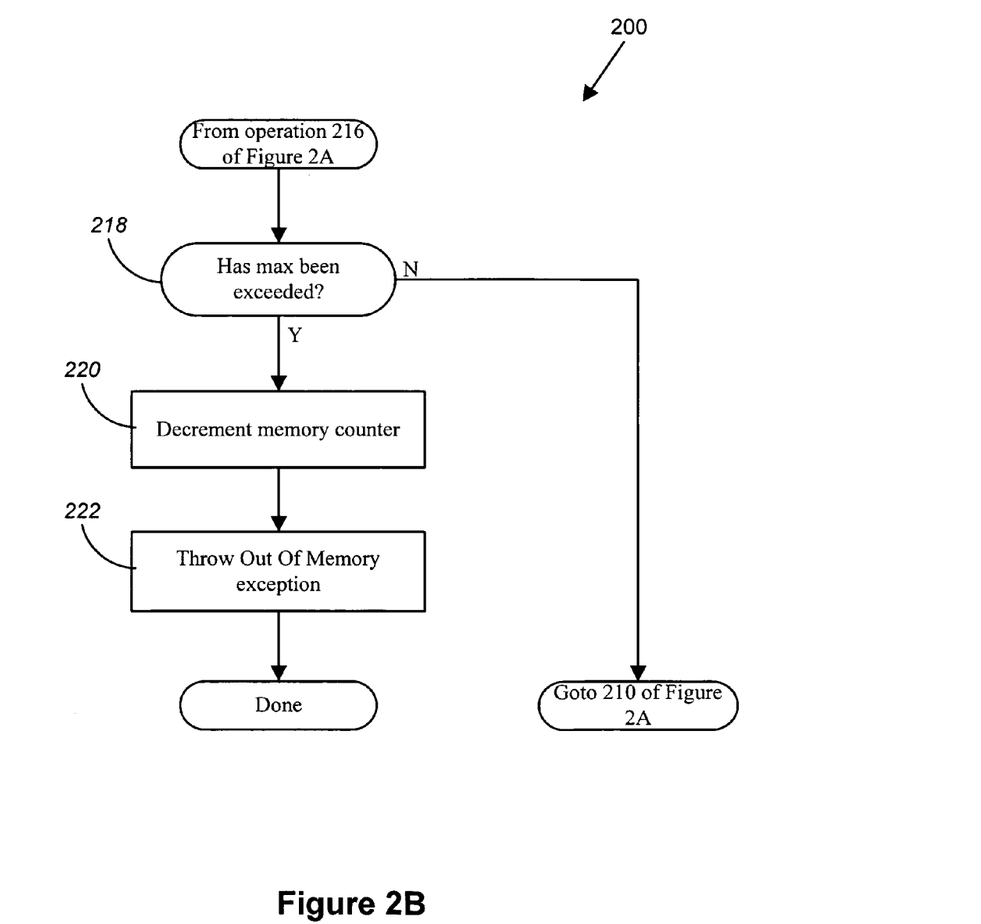

FIGS. 2A and 2B represent a flowchart illustrating a process 200 for allocating memory in accordance with an embodiment of the present invention. A similar procedure may be implemented for any type of resource that may be generally assigned in an absolute amount (e.g., number of bytes). For example, this procedure may be implemented for allocating open files, open sockets, and monitors.

Initially, an active protection domain is determined in operation 202. Techniques for determining the active protection domain are further described in *Java 2 Platform Security Architecture, API Design, and Implementation* by Li Gong (published by Addison Wesley, ISBN 0-201-31000-7), which text is herein incorporated by reference in its entirety. A resource context that is associated with the active protection domain is then identified in operation 204. Although assignment of the resource context is a policy decision and may be implemented in any suitable manner, in the illustrated embodiment the resource context is directly mapped to the active protection domain.

The mapping of a resource context to a particular protection domain may be set up a priori by the application framework. Alternatively, the application framework may create a separate classloader for each code source (e.g., each URL site). All classes loaded by a particular classloader are then assigned to a particular protection domain for that code source. The application framework then instantiates a resource context and associates it with the protection domain of the particular classloader.

A memory counter is then incremented for the identified resource context in operation 206. It is then determined whether a resource usage threshold has been exceeded in operation 208. For example, it is determined whether the limit1, limit2, or maxLimit thresholds of FIG. 1 has been exceeded. Alternatively, it may be determined whether a highLimit value is exceeded.

If the resource usage threshold has not been exceeded, memory is allocated and a resource context is then recorded for the allocated memory in operation 210. For example, a pointer to the resource context is recorded within the allocated memory portion. Thus, when the memory portion is deallocated, the resource counter of the appropriate resource context may then be decremented. After the resource context is recorded, the memory allocation procedure then ends.

If a resource usage threshold has been exceeded, a resource reclamation process may then be triggered in operation 212. For example, a garbage collection procedure is initiated for the heap memory. One embodiment of resource reclamation is described with reference to FIG. 3. Resource reclamation may be triggered to deallocate any memory that is no longer used by the responsible resource context's set of related code. This memory deallocation may cause the memory usage to no longer exceed a threshold.

After resource reclamation is triggered, it is then determined whether the threshold is still exceeded in operation 214. If the threshold is no longer exceeded, the memory is allocated and the resource context is recorded for the allocated memory in operation 210. The memory allocation procedure 200 then ends. The application then has a chance to cut back its memory usage.

If the threshold is still exceeded, registered resource callbacks may then be notified in operation 216. Any other alarm type mechanisms may be implemented for warning that the set of code of the resource context is approaching the maximum limit for a particular resource. For a callback type alarm, mechanisms could be made available that allow an application to register for callbacks from the application framework. For example, an applet may register to be informed when its memory usage exceeds a threshold. When a threshold is exceeded, the applet is then notified that it is approaching the maximum memory usage, for example.

Turning to FIG. 2B, it is then determined whether a maximum threshold is exceeded in operation 218. If the maximum threshold is not exceeded, memory is then allocated and a resource context is recorded for the allocated memory in operation 210 of FIG. 2A. However, if the maximum is exceeded, the memory counter is decremented in operation 220 (since it was previously incremented in operation 206). An Out Of Memory exception is then thrown to indicate that an error has occurred and memory will not be allocated in operation 222. The memory allocation procedure 200 then ends.

When a particular set of related code exceeds its maximum memory usage, mechanisms may be also implemented to abort the threads executing on behalf of the related code. Several embodiment for aborting related threads are described further in concurrently filed U.S. patent application Ser. No. 09/394,121 entitled, "Apparatus and Methods for Preventing Denial of Service Attacks" by William F. Foote, which has assignment rights in common and is incorporated herein by reference for all purposes.

Figure 3:
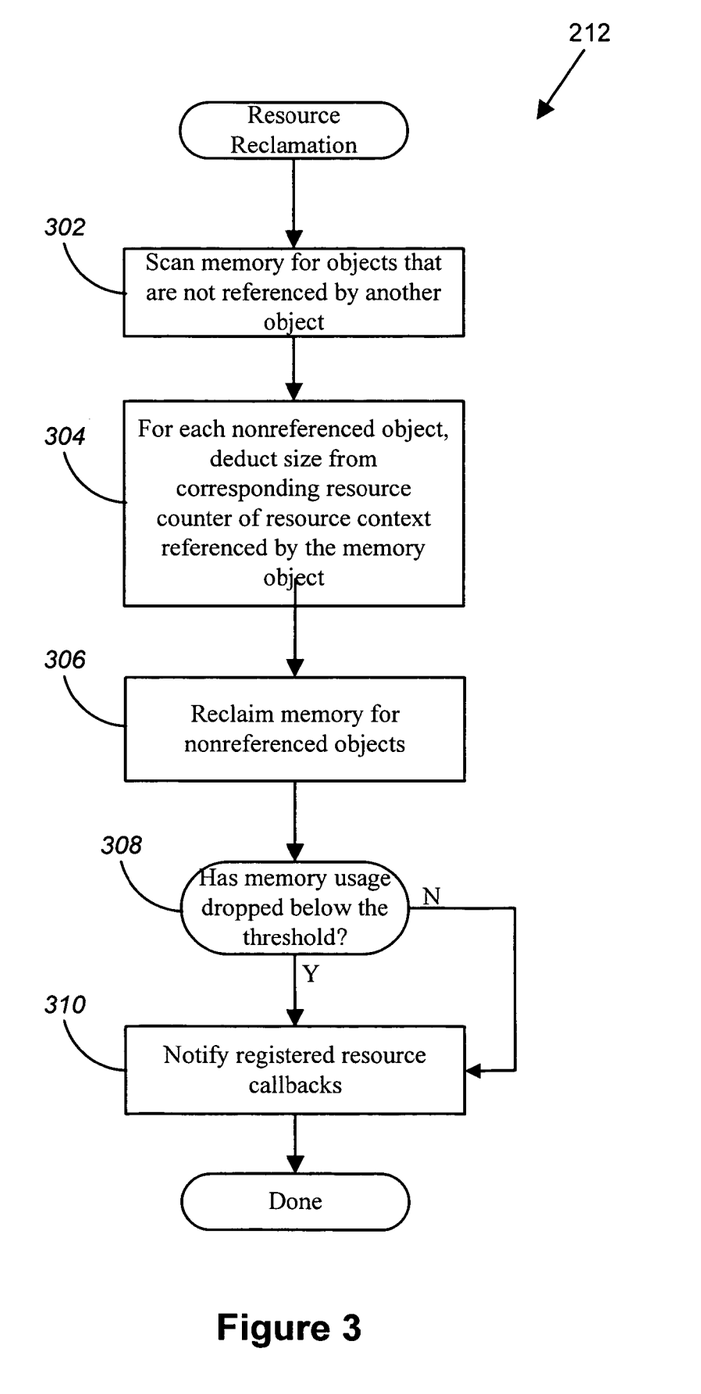
FIG. 3 is a flowchart illustrating the operation of FIG. 2 of reclaiming a resource in accordance with one embodiment of the present invention.

FIG. 3 is a flowchart illustrating the operation 212 of FIG. 2 of reclaiming a resource in accordance with one embodiment of the present invention. Initially, memory is scanned for memory objects that are not referenced by another object in operation 302. For example, a memory object may have been referenced by a local variable that is no longer in use. For each non-referenced memory object, the size is deducted from a corresponding resource counter of a resource context that is referenced by the memory object in operation 304 (e.g., a particular resource context was recorded in operation 210 of FIG. 2 during allocation of the memory object). The memory is then reclaimed for the non-referenced memory objects in operation 306.

It is then determined whether memory usage has dropped below a resource usage threshold in operation 308. Memory usage may have dropped, for example, because the associated applet decreased its memory usage in response to a warning that it was approaching the maximum memory limit. If memory usage has not dropped, the resource reclamation procedure 212 ends. If memory usage has dropped below the threshold, registered research callbacks are notified in operation 310. For example, an applet associated with the resource context is notified that it is no longer in danger of exceeding its maximum memory allotment. The memory reclamation procedure 212 then ends and control is passed back to the memory allocation procedure 200 of FIGS. 2A and 2B.

While the resource management techniques described above with reference to FIGS. 2 through 3 work well for resources that have absolute usage limits, other mechanisms may be implemented for managing other types of resouce usage that more easily measured or tracked in relative terms. For example, an applet's CPU usage may be tracked as a percentage of use during a particular time period. When the applet's CPU usage exceeds a certain percentage, one may not wish to halt the applet's use of the CPU altogether but simply decrease the applet's priority for using the CPU.

Figure 4:
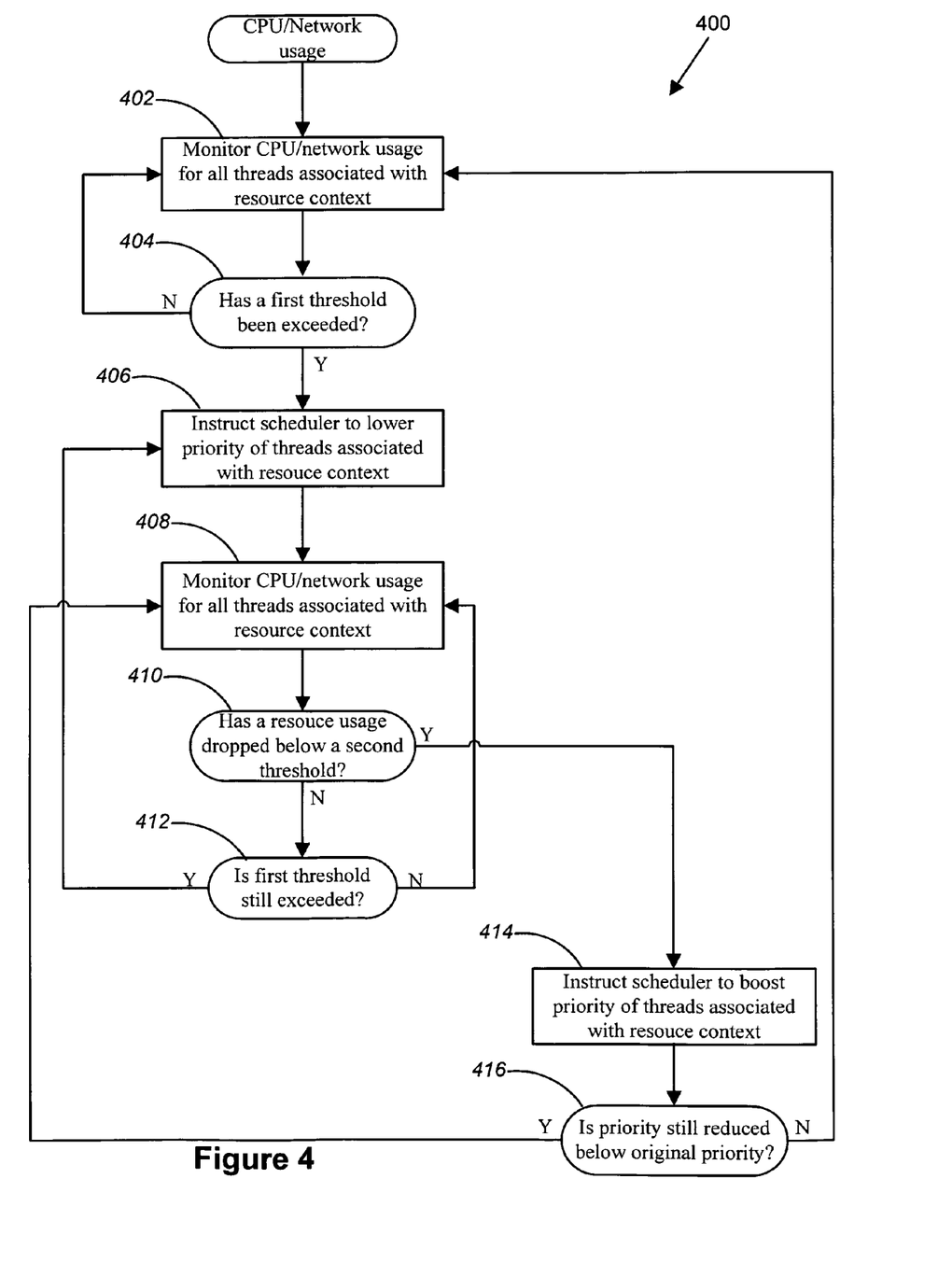
FIG. 4 is a flowchart illustrating a process for managing CPU or network usage in accordance with one embodiment of the present invention.

FIG. 4 is a flowchart illustrating a process 400 for managing CPU or network usage in accordance with one embodiment of the present invention. Of course, a similar resource may also be managed with the procedure of FIG. 4. Initially, the CPU or network usage is monitored for all threads associated with a resource context in operation 402. It is then determined whether a first threshold is exceeded in operation 404. If the first threshold is not exceeded, CPU or network usage continues to be monitored in operation 402.

If the first threshold is exceeded, the scheduler is instructed to lower the priority of the threads associated with the resource context in operation 406. The CPU or network usage is then monitored again for all the threads associated with the resource context in operation 408 to determine when to boost the priority back up. It is then determined whether resource usage has dropped below a second threshold in operation 410. Of course, a single threshold may be used to determine when to lower and boost the priority.

If usage has not dropped below the second threshold, it is then determined whether the first threshold is still exceeded in operation 412. If the first threshold is still exceeded, the scheduler is again instructed to lower the priority of the thread associated with the resource context in operation 406. In other words, the priority of the thread associated with a particular resource context continues to be lowered as the long as the first threshold is still exceeded. If the first threshold is not exceeded, the CPU or network usage is then monitored again for all the thread associated with the resource context in operation 408 to determine whether to lower the priority again (via operation 414) or to boost the priority back up (via operation 406).

When the resource usage drops below the second threshold, the scheduler is then instructed to boost the priority of the thread associated with resource context in operation 414. It is then determined whether the priority is reduced below the original priority in operation 416. If it is not reduced below the original priority, CPU or network usage is monitored for all threads associated with the resource context in operation 402 to determine whether to drop the priority (i.e., when memory consumption exceeds the first threshold). If the priority is reduced below the original priority, the CPU or network usage is monitored in operation 408 to determine when to boost the priority (i.e., when dropping below the second threshold).

These mechanisms for tracking resource usage may then be utilized to determine whether a particular code set is utilizing too much of a resource type. For example, the resource counter of a particular resource context and associated code set may be analyzed (e.g., compared against a predetermined limit for the particular resource) to determine whether the resource context is consuming too much of that particular resource type (or is about to consume too much). When it is determined that a particular set of related code is consuming too much of a particular resource, steps may then be taken to halt and/or prevent further consumption.

Figure 5:
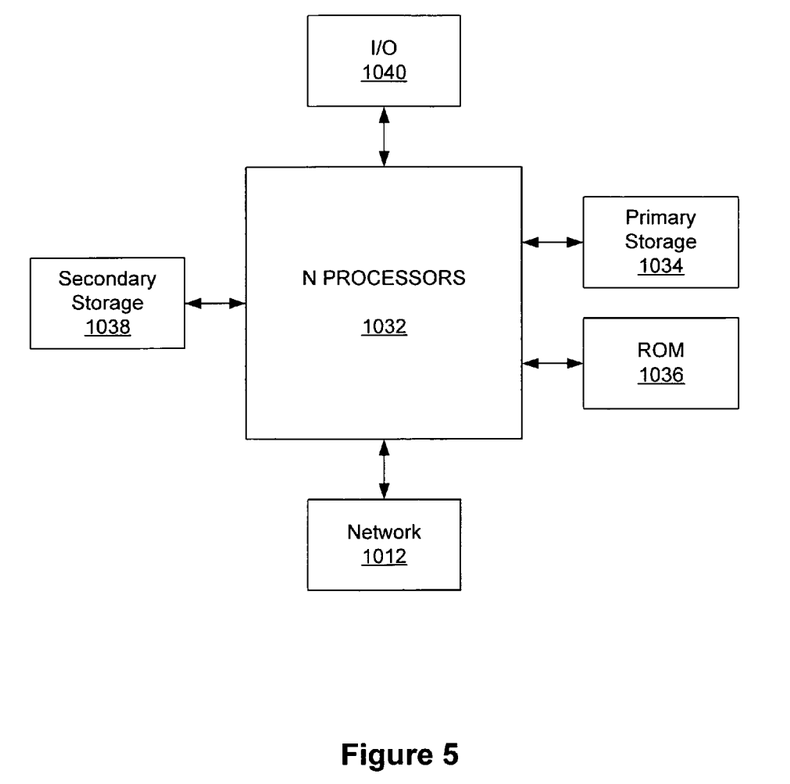
FIG. 5 illustrates a typical, general-purpose computer system suitable for implementing the present invention.

FIG. 5 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, the computer system may be integrated with a navigational system or television set top box.

Computer system 1030 or, more specifically, CPUs 1032, may be arranged to support a virtual machine, as will be appreciated by those skilled in the art. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described mechanisms for managing resource usage. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the operations involved with resource management may be reordered. Steps may also be removed or added without departing from the spirit or the scope of the present invention.

Although the techniques for managing resource usage in accordance with the present invention are particularly suitable for implementation with respect to a Java™ based environment, the techniques may generally be applied in any suitable object-based environment. In particular, the techniques are suitable for use in platform-independent object-based environments. It should be appreciated that the methods may also be implemented in some distributed object-oriented systems.

Additionally, although registered callbacks were initiated when memory usage exceeded a threshold, callbacks may be eliminated altogether. When a set of related code has exceeded a maximum threshold, further memory consumption may simply be prevented or minimized. In contrast, although registered callbacks were not initiated when a set of related code's CPU or network usage exceeded a threshold, of course, callbacks may also be implemented when CPU or network usage limits are reached. Callbacks may also be initiated when CPU or network usage drops below a threshold.

Although resource reclamation was initiated when a resource context exceeds any of the resource limits, of course, resource reclamation may be eliminated or only initiated after a single limit is exceeded. Also, resource reclamation may simply be triggered periodically in a parallel process that has nothing to do with whether or not the resource context has exceeded a resource limit.

Accordingly, the present embodiments are to be considered as illustrative and not restrictive, and the invention is not to be limited to the details given herein, but may be modified within the scope and equivalents of the appended claims.

What is claimed is:

1. A computer-implemented method for managing resource usage of code downloaded to a computer system, the method comprising:

for each code downloaded to the computer system, associating a resource indicator with all threads that are executed directly by the downloaded code and all threads that are initiated by the downloaded code, wherein all of the threads that are executed directly by the downloaded code and all threads that are initiated by the downloaded code are defined as a set of related code;

associating the set of related code with each resource portion of a particular resource that is allocated for the set of related code;

disassociating, through a garbage collection procedure, the set of related code with each resource portion of the particular resource that is deallocated for the set of related code; and updating the resource indicator every time that the set of related code changes its actual collective resource usage of a particular resource so that the resource indicator only tracks actual resource usage of the set of related code, wherein the updating includes increasing the resource indicator every time the resource portion is allocated for the set of related code and decreasing the resource indicator every time the resource portion is deallocated for the set of related code.

2. A method as recited in claim 1 wherein the resource indicator's amount represents an absolute value of the resource usage.

3. A method as recited in claim 1 wherein the resource indicator's amount represents a proportional value of the resource usage.

4. A method as recited in claim 1 further comprising:
allocating the particular resource to the set of related code when the resource indicator is below a maximum predetermined threshold; and
indicating an error and not allocating the particular resource when the resource indicator is above the maximum predetermined threshold.

5. A method as recited in claim 4 wherein the error is indicated by throwing an out_of_memory exception.

6. A method as recited in claim 1 wherein the particular resource is selected from a group consisting of memory usage, open file usage, open socket usage, and monitor usage.

7. A method as recited in claim 6 wherein the resource indicator indicates a percentage of the particular resource that is utilized by the set of related code.

8. A method as recited in claim 6 further comprising:
associating a plurality of thresholds with the particular resource and the set of related code; and
notifying a registered resource callback when the amount of resource usage of the particular resource by the set of related code exceeds a first one of the thresholds.

9. A method as recited in claim 8 further comprising notifying a registered resource callback when the amount of resource usage of the particular resource by the set of related code drops below a second one of the thresholds that has a different value than the first threshold.

10. A method as recited in claim 8 further comprising notifying a registered resource callback when the amount of resource usage of the particular resource by the set of related code drops below the first threshold.

11. A method as recited in claim 1 wherein the particular resource is CPU usage or network usage.

12. A method as recited in claim 11 further comprising:
associating a threshold with the particular resource and the set of related code; and
indicating that the set of related code's priority for CPU usage be decreased when the amount of resource usage of the particular resource by the set of related code exceeds the threshold.

13. A method as recited in claim 12 further comprising:
associating a second threshold with the particular resource and the set of related code; and
indicating that the set of related code's priority for CPU usage be boosted when the amount of resource usage of the particular resource by set of the related code drops below the second threshold.

14. A method as recited in claim 1 wherein the set of related code is configured to be executed on behalf of an applet in form of threads.

15. A method as recited in claim 1 further comprising:
associating a plurality of resource indicators with the set of related code that each indicates an amount of resource usage of a plurality of resources by the set of related code; and
updating a selected resource indicator when the set of related code increases or decreases its collective resource usage of the associated resource.

16. A method as recited in claim 15 wherein the resources include memory usage, CPU usage, and network usage.

17. A method as recited in claim 16 wherein the resources further include open file usage and open socket usage.

18. A method as recited in claim 1, further comprising determining which threads are to be defined as the set of related code based on which threads are assigned to a same protection domain.

19. A method as recited in claim 1, further comprising aborting the threads of the set of related code when their resource indicator exceeds a maximum level.

20. A method as recited in claim 1, wherein the computer system is integrated with a set top box or a navigational system.

21. A computer program product, stored on a machine-readable medium, containing computer code for managing resource usage of code downloaded to a computer system, the computer program product including:
computer code for associating for each code downloaded to the computer system a resource indicator with all threads that are executed directly by the downloaded code and all threads that are initiated by the downloaded code, wherein all of the threads that are executed directly by the downloaded code and all threads that are initiated by the downloaded code are defined as a set of related code;
computer code for associating the set of related code with each resource portion of a particular resource that is allocated for the set of related code;
computer code for disassociating, through a garbage collection procedure, the set of related code with each resource portion of the particular resource that is deallocated for the set of related code; and
computer code for updating the resource indicator every time that the set of related code changes its actual collective resource usage of the particular resource so that the resource indicator only tracks actual resource usage of the set of related code, wherein the updating includes increasing the resource indicator every time the resource portion is allocated for the set of related code and decreasing the resource indicator every time the resource portion is deallocated for the set of related code.

22. A computer program product as recited in claim 21 further comprising:
computer code for allocating the particular resource to the set of related code when the resource indicator is below a maximum predetermined threshold; and
computer code for indicating an error and not allocating the particular resource when the resource indicator is above the maximum predetermined threshold.

23. A computer program product as recited in claim 21 wherein the particular resource is selected from a group consisting of memory, open files, open sockets, and monitors.

24. A computer program product as recited in claim 23 further comprising:
computer code for associating a plurality of thresholds with the particular resource and the set of related code; and
computer code for notifying a registered resource callback when the amount of resource usage of the particular resource by the set of related code exceeds a first one of the thresholds.

25. A computer program product as recited in claim 23 further comprising computer code for notifying a registered resource callback when the amount of resource usage of the particular resource by the set of related code drops below a second one of the thresholds that has a different value than the first threshold.

26. A computer program product as recited in claim 21 wherein the particular resource is CPU usage or network usage.

27. A computer program product as recited in claim 26 further comprising:
   computer code for associating a threshold with the particular resource and the set of related code; and
   computer code for indicating that the set of related code's priority for CPU usage be decreased when the amount of resource usage of the particular resource by the set of related code exceeds the threshold.

28. A computer program product as recited in claim 27 further comprising:
   computer code for associating a second threshold with the particular resource and the set of related code; and
   computer code for indicating that the set of related code's priority for CPU usage be boosted when the amount of resource usage of the particular resource by the set of related code drops below the second threshold.

29. A computer program product as recited in claim 21 wherein the set of related code is configured to be executed on behalf of an applet in form of threads.

30. A computer program product as recited in claim 21, further comprising computer code for determining which threads are to be defined as the set of related code based on which threads are assigned to a same protection domain.

31. A computer program product as recited in claim 21, further comprising computer code for aborting the threads of the set of related code when their resource indicator exceeds a maximum level.

32. A computer program product as recited in claim 21, wherein the computer system is integrated with a set top box or a navigational system.

* * * * *